United States Patent

[11] 3,627,337

[72] Inventor Aaron J. Pippert
 Houston, Tex.
[21] Appl. No. 791,936
[22] Filed Jan. 17, 1969
[45] Patented Dec. 14, 1971
[73] Assignee Universal Packing & Gasket Company
 Houston, Tex.

[54] PACKING RING FOR USE UNDER HIGH
 TEMPERATURES AND PRESSURES
 8 Claims, 6 Drawing Figs.
[52] U.S. Cl.................................................... 277/233,
  277/206
[51] Int. Cl...................................................... F16j 15/08
[50] Field of Search............................................ 277/233,
  205, 206, 227, 228

[56] References Cited
 UNITED STATES PATENTS
3,501,157 3/1970 Doutt............................ 277/205 X
2,041,565 5/1936 Miller............................ 277/233
2,639,198 5/1953 Kirkham....................... 277/233 X
3,126,440 3/1964 Goodloe........................ 277/233 X
3,464,709 9/1969 Furgason et al. ............. 277/233 X
 FOREIGN PATENTS
502,643 3/1939 Great Britain................ 277/233
826,214 12/1959 Great Britain................ 277/233

Primary Examiner—William E. Wayner
Attorney—Ralph R. Browning

ABSTRACT: A packing ring which would normally be used in a stuffing box or the like but which may be of any of numerous cross sections desired for specific installations, the packing ring being made up of alternating layers or laminations of thermosetting materials and thermoplastic materials respectively. The thermosetting materials and the thermoplastic materials could be of an desired materials of the type indicated but would preferably be selected so as to impart to the finished seal ring characteristics of the materials so selected which might be desired for a specific surface. Each layer or lamination would be made up of a fabric treated with rubber or some other suitable natural or synthetic resin and, in the case of the thermoplastic composition materials, would be made up of Nylon, tetrafluoroethylene, or acrylic plastic by way of examples, and in either case being impregnated with rubber or a synthetic resin or the like. The thermosetting materials would consist of fibers or fabrics of cotton, asbestos, fiber glass, or the like, by way of example, likewise impregnated with rubber or a resinous compound. These would be laid in alternating fashion one on top of the other to provide a sufficient volume for the body to be formed, and then would be pressure molded into the cross section shape desired and heat treated until both the thermoplastic and the thermosetting laminations would solidify and bond to one another to make up a monolithic ring.

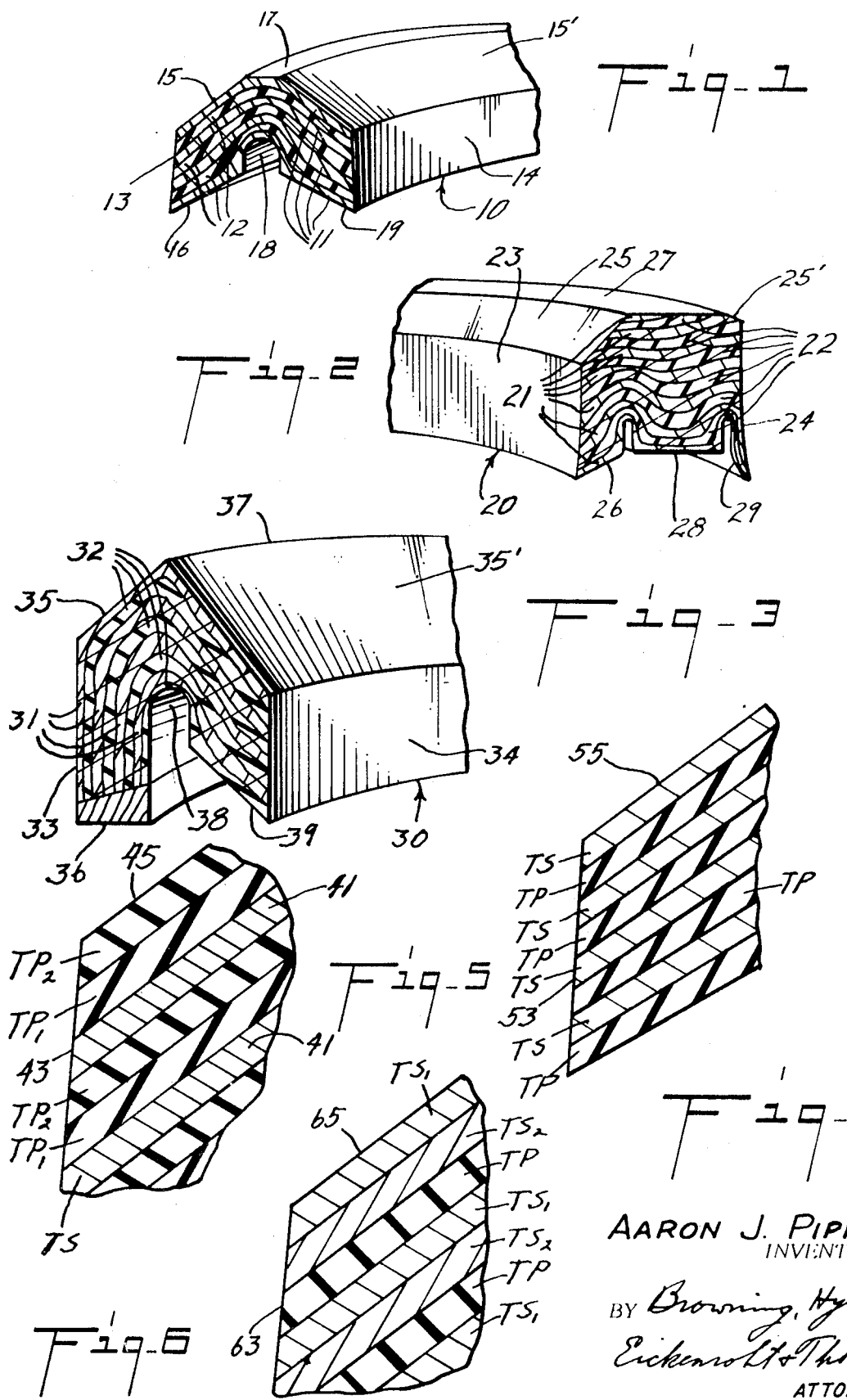

PACKING RING FOR USE UNDER HIGH TEMPERATURES AND PRESSURES

BACKGROUND OF THE INVENTION

In the manufacture of various types of seals, particularly rings having lip seals, various designs and materials have been used to achieve the desired characteristics of the finished seal. In many applications it has been found necessary to have seals with low frictional characteristics, low distortion, flow, expansion, etc. This is particularly true when the seals were to be subjected to high pressures or high temperatures or both.

In the past it has also been standard practice to manufacture such lip-type seals by laminating or laying on top of one another laminations of rubberized fabric compositions and molding the same to various shapes. Some of these compositions so employed have been fabric of Nylon, cotton duck, asbestos, fiber glass, and other similar type materials. These have been "rubberized," and it may be here said that this term "rubberized" will be used hereinafter to designate a fabric which has been impregnated with natural or synthetic rubber or natural or synthetic resins or the like having the capabilities of molding to shape and after cooling of retaining such shape and of bonding together the various layers or laminations of material to form the finished seal. Also "resinous compound" is intended to include natural and synthetic rubbers and resins.

Designs of seals of the character just described have been limited to rather narrow ranges of utility because many of the above-mentioned compositions, when used alone, would not in all cases achieve the desired results. Some have been found to have a very high frictional drag which in use under high pressures would mechanically resist motion, cause the generation of excessive heat, and cause excessive wear on moving parts which they engage. Some will expand, fracture, flow, or distort excessively or have a combination of these problems.

It has also been known for a long time that certain of such compositions having low frictional characteristics, such as Nylon, tetrafluoroethylene, polyesters and acrylic plastics, and other similar thermoplastic types, will perform well in service when molded into various seals. Materials of this character will be referred to hereinafter and in the claims simply as thermoplastic materials. However, these thermoplastic materials react in widely unexpected and unpredictable ways when subjected to service wherein they encounter high temperatures, high pressures, etc. Being thermoplastic in nature, they have the tendence to flow or deform easily, resulting in excessive heat buildup on the wearing surface of the seal. Also, in most instances, the actual dimension of the seal will change. This is particularly true when the seal is subjected to pressures and then allowed to remain in a relaxed state for any length of time, and will result in excessive leakage when pressure is reapplied.

It is an object of this invention to provide seals which will have the desirable characteristics of seals heretofore made with thermoplastic-type composition materials, such as rubberized Nylon, tetrafluoroethylene, polyesters, acrylics, and the like but which would not have the wild and unpredictable reactions that such materials have when subjected to service wherein they encounter high temperatures, high pressures, etc. More specifically, it is desired to make such seals which will not have such tendency to flow or deform easily as will result in excessive heat buildup on the wearing surface of the seal, and in which changes in actual dimensions of the seal will not take place under such conditions as when subjected to pressures and then allowed to remain in a relaxed state for a length of time.

It is a further object to provide such a seal which will not have high frictional drag or tendency to fracture or other problems normally encountered under high temperature and pressure conditions in seals made up of materials of thermosetting characteristics such as rubberized cotton, asbestos, fiber glass and the like, but will have the desirable characteristics of seals made with those materials in that they will not have a tendency to stretch, give, or flow, more than desirable in effecting an efficient seal. Materials of this character will be referred to hereinafter and in the claims simply as thermosetting materials. It has been found, remarkably enough, that by interleaving or alternating laminations of thermoplastic type composition material, such as rubberized Nylon, tetrafluoroethylene, acrylics, and the like, with such materials as thermosetting laminations of rubberized cotton, asbestos, fiber glass, and the like, are highly effective in achieving the objectives above set forth. Bodies made up of laminations of such materials in which the thermoplastic and thermosetting materials are alternated, and then pressure molded to the desired shape of cross section while being heated, and afterward being allowed to cool, will be restrained against excessive flow of the thermoplastic components by the more or less rigid nonflowing characteristics of the molded thermosetting material, but will permit sufficient flow of the thermoplastic materials within their respective laminations so as to allow them to flow to engage the surface to be sealed against and form a seal which is effective thereagainst, but without being allowed to exert such force against such surfaces as to produce excessive friction and heat.

Other objects and advantages of this invention will become apparent from the following description taken in connection with the accompanying drawing wherein are set forth by way of illustration and example but not by way of limitation certain embodiments of the invention.

In the drawings:

FIG. 1 is a perspective view of a fragment of a seal ring constructed in accordance with this invention, showing the alternating laminar construction of the body of the ring in cross section.

FIG. 2 is a view similar to FIG. 1 but showing a different shape of cross section of ring.

FIG. 3 is a view similar to FIGS. 1 and 2 but showing still a third shape of cross section of ring.

FIG. 4 is an enlarged fragmentary portion of the cross section of a ring or other seal constructed in accordance with this invention and illustrating the alternate layer laminar construction of the seal.

FIG. 5 is a view similar to FIG. 4 but showing a modification in which two laminations of thermoplastic seal material are employed between each pair of succeeding layers of thermosetting sealing material.

FIG. 6 is a view similar to FIGS. 4 and 5 but showing a modified form of the invention in which there are two laminations of thermosetting material interposed between each succeeding pair of laminations of thermoplastic material.

Referring now more in detail to the drawings, there is shown in FIG. 1 a section of what is customarily known as a chevron-type seal ring, the same being modified in this instance to provide a flat endwise bearing surface on the apex of the chevron whereby a series of such rings with spacers interposed therebetween could be tightened to the stuffing box without necessarily forcing the rings or lips of the ring outwardly into a tight sealing engagement and thereby placing unnecessary and unwanted sealing pressure against them. This segment 10 of such a sealing ring is shown as having a body with alternating laminations 11 of thermosetting material. In accordance with this invention such material would consist of at least one fibrous or fabric material of thermosetting characteristics such as rubberized cotton, asbestos, fiber glass, and the like, and of layers of thermoplastic material 12 alternating therewith and formed of suitable thermoplastic type composition materials such as rubberized Nylon, tetrafluoroethylene, polyesters and acrylic. These laminations are so arranged as to present edges thereof along the surface 13 which is intended to provide one of the lip-type sealing surfaces for sealing against one of the members to be sealed between. The laminations likewise present an opposite edge surface to the sealing surface 14 of the opposite lip. The wings of the chevron are completed by the sloping upper surface 15, the lower surface 16 on the ring which carries the surface 13, and by the flat upper apex 17 which has the purpose previously described, the recessed lower portion 18 for receiving a spacer, and the upper inclined surface 15' and lower surface 19 of the opposite wing of the chevron.

By reference to FIG. 2 the most substantial difference between this form and the form shown in FIG. 1 lies in the shape of cross section wherein the body 20 made up of laminar portions of thermosetting material 21 and thermoplastic material 22 alternated with one another is molded so as to provide a cross-sectional form of ring with an inner lip-type sealing surface 23 and an outer type sealing surface of much more flexible nature 24. This fragment of a ring also has an upwardly sloping portion 25 and another upwardly sloping portion 25' opposed thereto adjacent the outside of the ring, a lower inclined portion 26 on the lip 23, and a flattened apex portion 27. The shape of outline of this ring is completed by a flat lower surface 28 separated by grooves from the lip-type portions 23 and 24 and serving as a bearing to receive another lower ring and bear thereon against a surface similar to the surface 27 of the ring illustrated. In this case the purpose and effect of the use of alternating thermosetting and thermoplastic laminations and in molding the same into a finished body shape is very similar to that illustrated in FIG. 1.

In FIG. 3 is a third form of cross section of ring 30 made up of thermosetting material laminations 31 and thermoplastic laminations 32 alternating therewith. It has an axial sealing surface 33 on its exterior and an axial sealing surface 34 on its interior with upwardly sloping surfaces 35 and 35' which approach the apex 37. The lower end of the sealing leg or lip 33 is shown at 36 and is intended in this instance to receive a member tightening it within a stuffing box or the like. Between this portion or leg and the sealing lip 39 is a recess 38 so that the lip 39 may have sufficient flexibility to perform its function.

In each of the shapes of ring shown in FIGS. 1, 2, and 3 the laminations of thermosetting and thermoplastic material making up the same are shown as alternating having one ring of one material then one ring of the other material then another ring of the first material and so on. It is noted that the thermosetting material as well as the thermoplastic material will be selected such that the thermosetting material will sufficiently restrain the flow and expansion and contraction of the thermoplastic material for the use intended, and that the thermoplastic material is selected so as to provide adequate flow and shifting to form the necessary seal and at the same time to provide sufficient sealing pressure without excessive frictional resistance to movement of the seal surface.

An arrangement such as that shown in each of FIGS. 1, 2 and 3 with respect to the laminations employed, is illustrated in FIG. 4 wherein are shown adjacent the sealing surface 53 a series of alternating thermosetting laminations beginning with the uppermost surface 55 of the seal, these thermosetting laminations being designated TS, and interleaved laminations TP of thermoplastic material. In this instance there are shown an equal number of laminations of the two materials although this is not necessary. Also, it is to be noted that if it be desired for the purpose of achieving the desired characteristics in the ultimate seal member, different types of thermoplastic may be employed in the various different laminations and likewise different types of thermosetting material may be employed at different places in the same body.

Another arrangement is shown in FIG. 5 wherein somewhat greater flow and sealing characteristics may be required than in the structures shown in FIGS. 1 to 4, inclusive, and for this purpose, there will be exposed through the sealing edge 43 beginning with the upper surface 45 a series of interleaved thermosetting laminations TS and thermoplastic laminations $TP_1$ and $TP_2$. In this instance the thermoplastic laminations are illustrated as being placed together to form a pair with one pair of thermoplastic laminations between each adjacent pairs of thermosetting laminations. Obviously the two kinds of thermoplastic laminations would be selected with a view to providing in the finished product the characteristics desired therefore.

It should be noted that in FIG. 6 there is shown also a fragmentary portion of a body similar to those shown in FIGS. 4 and 5, this portion having a sealing surface 63 adapted to be pressed against the surface of another member to seal against the same while there is relative movement therebetween, an upper inclined surface 65, and alternating thermosetting and thermoplastic laminations, there being in this instance two thermosetting laminations $TS_1$ and $TS_2$ interposed between each pair of thermoplastic laminations TP. The thermosetting laminations, being of different kinds from one another, but both being of a thermosetting nature, will be selected for the purpose of imparting to the finished seal certain characteristics found to be available from the particular thermosetting material selected for this purpose.

It will be clear that seals constructed in accordance with this invention may be made of various and sundry shapes both as illustrated and otherwise and that the invention lies not in the particular shape of seal that is employed but in the construction of the seal whereby alternating layers of thermosetting and thermoplastic materials are employed for the purposes specified. Furthermore, it will be seen that various types of combinations of thermosetting materials may be employed either in adjacent laminations or in separated laminations in a ring as illustrated, or that only one type of thermosetting material be employed as shown, for example, in FIGS. 1 to 4, inclusive. It will further be apparent that various combinations of thermoplastic materials may be employed either for adjacent laminations or for laminations separated from one another in the structure for the purpose of developing in the finished product any characteristics for one or the other type of thermoplastic laminations as might be desired. Thus, the invention as illustrated in the drawing is developed around the discovery that alternating layers of thermoplastic and thermosetting materials may be employed so as to gain the desirable flow characteristics and sealing characteristics of the thermoplastic material while inhibiting the undesirable characteristics thereof such as expansion, excessive pressures developed against the sealing surfaces with the resulting ultra high friction, etc., these last being inhibited by use of the alternating layers of thermosetting material which serve to restrain and restrict the thermoplastic material without preventing it altogether from flowing, but instead permitting such flow and reshaping as is necessary for the successful operation of the seal but inhibiting undesirable greater flow and friction. Thus the invention employs the thermosetting laminations to restrain excessive flow and friction otherwise inherent in thermoplastic materials while not completely inhibiting the same but permitting sufficient for the purpose of achieving an efficient seal. It also makes possible the selection of one or more than one type of thermoplastic material and one or more than one type of thermosetting materials so as to achieve in the finished seal product the most desirable characteristics for the particular use to which it is to be put.

The invention having been described, what is claimed is:

1. A packing for sealing between two relatively movable parts and adapted to be disposed in a space between said parts and pressed thereagainst in use to provide such seal, said packing comprising a body having alternating laminations of fibrous thermoplastic and of fibrous thermosetting material bonded together and molded and cured in a desired cross section shape, said thermoplastic material and said thermosetting material each being impregnated with a resinous compound, said resinous compound having the capability of molding to shape and after cooling retaining such shape and of bonding together said laminations to form said packing.

2. A packing as set forth in claim 1 in which said thermoplastic material comprises a material selected from the group consisting of nylon, tetrafluoroethylene, polyesters and an acrylic plastic.

3. A packing as set forth in claim 1 in which said thermosetting material comprises a material selected from the group consisting of cotton, asbestos, and fiber glass.

4. A packing as set forth in claim 2 in which said thermosetting material comprises a material selected from the group consisting of cotton, asbestos and fiber glass.

5. The packing of claim 1 in which said laminations are so disposed as to present their edges to an adjacent surface of one of said parts which surface in use moves relative to said packing.

6. A packing as set forth in claim 1 in which said laminations of thermoplastic are made up of a plurality of different types of thermoplastics selected to impart a desired combination of characteristics to the packing when finished.

7. A packing as set forth in claim 6 in which a thermoplastic lamination is comprised of a plurality of laminations of different thermoplastics contiguous to and bonded to one another.

8. A packing as set forth in claim 6 in which a thermosetting material lamination is comprised of a plurality of laminations of different thermosetting materials contiguous to and bonded to one another.

* * * * *